(12) United States Patent
Maza

(10) Patent No.: US 11,200,771 B2
(45) Date of Patent: Dec. 14, 2021

(54) ELECTRONIC VOTING SYSTEM AND METHOD

(71) Applicant: Christopher Maza, Palm Beach Gardens, FL (US)

(72) Inventor: Christopher Maza, Palm Beach Gardens, FL (US)

( * ) Notice: Subject to any disclaimer, the term of this patent is extended or adjusted under 35 U.S.C. 154(b) by 221 days.

(21) Appl. No.: 16/200,161

(22) Filed: Nov. 26, 2018

(65) Prior Publication Data

US 2020/0098217 A1 Mar. 26, 2020

Related U.S. Application Data

(60) Provisional application No. 62/737,056, filed on Sep. 26, 2018.

(51) Int. Cl.
| | | |
|---|---|---|
| *G07C 13/00* | (2006.01) | |
| *H04L 12/46* | (2006.01) | |
| *H04L 29/12* | (2006.01) | |

(52) U.S. Cl.
CPC .......... *G07C 13/00* (2013.01); *H04L 12/4641* (2013.01); *H04L 61/1511* (2013.01)

(58) Field of Classification Search
CPC ............... G06Q 20/385; G06Q 20/341; G06Q 20/3223; G06Q 30/0185; G06Q 20/3224; G06F 21/316; G06F 21/335; G06F 21/41; H04L 63/0807; H04L 9/14; H04L 9/3273; H04L 63/083; H04L 12/4641; H04L 61/1511; G07C 13/00
See application file for complete search history.

(56) References Cited

U.S. PATENT DOCUMENTS

| | | | | |
|---|---|---|---|---|
| 6,332,193 | B1 * | 12/2001 | Glass | G07F 7/1008 713/170 |
| 6,360,254 | B1 * | 3/2002 | Linden | G06F 21/31 709/219 |
| 6,848,109 | B1 * | 1/2005 | Kuhn | G06F 9/466 718/101 |
| 2004/0044791 | A1 * | 3/2004 | Pouzzner | G06F 40/12 709/245 |
| 2004/0250119 | A1 * | 12/2004 | Shelest | H04L 63/08 726/4 |
| 2005/0091543 | A1 * | 4/2005 | Holtzman | H04L 29/06 726/19 |
| 2009/0179071 | A1 * | 7/2009 | Backert | G06F 21/6263 235/51 |
| 2013/0268649 | A1 * | 10/2013 | Ra | G06F 16/951 709/224 |
| 2015/0295882 | A1 * | 10/2015 | Kaliski, Jr. | H04L 61/1511 709/217 |
| 2019/0051079 | A1 * | 2/2019 | Venkataraman | H04L 9/3239 |
| 2019/0089544 | A1 * | 3/2019 | Yang | H04L 9/321 |

\* cited by examiner

*Primary Examiner* — Johann Y Choo
(74) *Attorney, Agent, or Firm* — RC Trademark Company

(57) ABSTRACT

According to some embodiments, a system and method associated with an electronic voting system are provided. The system comprises a voting station associated with a voting precinct to receive an electronic vote from a voter. A recursive server (RS) receives the electronic vote from the voting station and determines a voting precinct vote count. An authoritative name server (ANS) receives the electronic vote from the RS and determines a final vote count associated with one or more voting precincts.

7 Claims, 5 Drawing Sheets

ELECTRONIC VOTING SYSTEM AND METHOD

BACKGROUND

Current voting systems require an individual citizen to be physically present at the polling station to exercise the right to vote. The voting systems currently used divide a voting precinct into one or more individual polling stations. To calculate totals for a voting precinct, totals for each individual that votes at a polling station are calculated and then these totals are added to determine a precinct total. Most conventional voting systems currently used are either based on scannable cards or mechanical machines that utilize counters. The idea of electronic voting is continually dismissed due to the potential of voter fraud since computer networks and computer systems are susceptible to hackers who could then influence an outcome of a vote.

It would therefore be desirable to provide a system to allow for electronic voting over a computer network that has robust security to prevent hackers from influencing an outcome of a vote.

SUMMARY

Some embodiments described herein relate to a system and a method associated with an electronic voting system. The system may comprise a voting station associated with a voting precinct to receive an electronic vote from a voter. A recursive server (RS) may receive the electronic vote from the voting station and determine a voting precinct vote count. An authoritative name server (ANS) may receive the electronic vote from the RS and determine a final vote count associated with one or more voting precincts.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, components and circuits have not been described in detail so as not to obscure the embodiments.

The present embodiments relate to a system and method for voting and tallying votes over a computer network. Moreover, the present embodiments relate to a system that prevents fraud from occurring in an electronic voting system.

Figure 1:
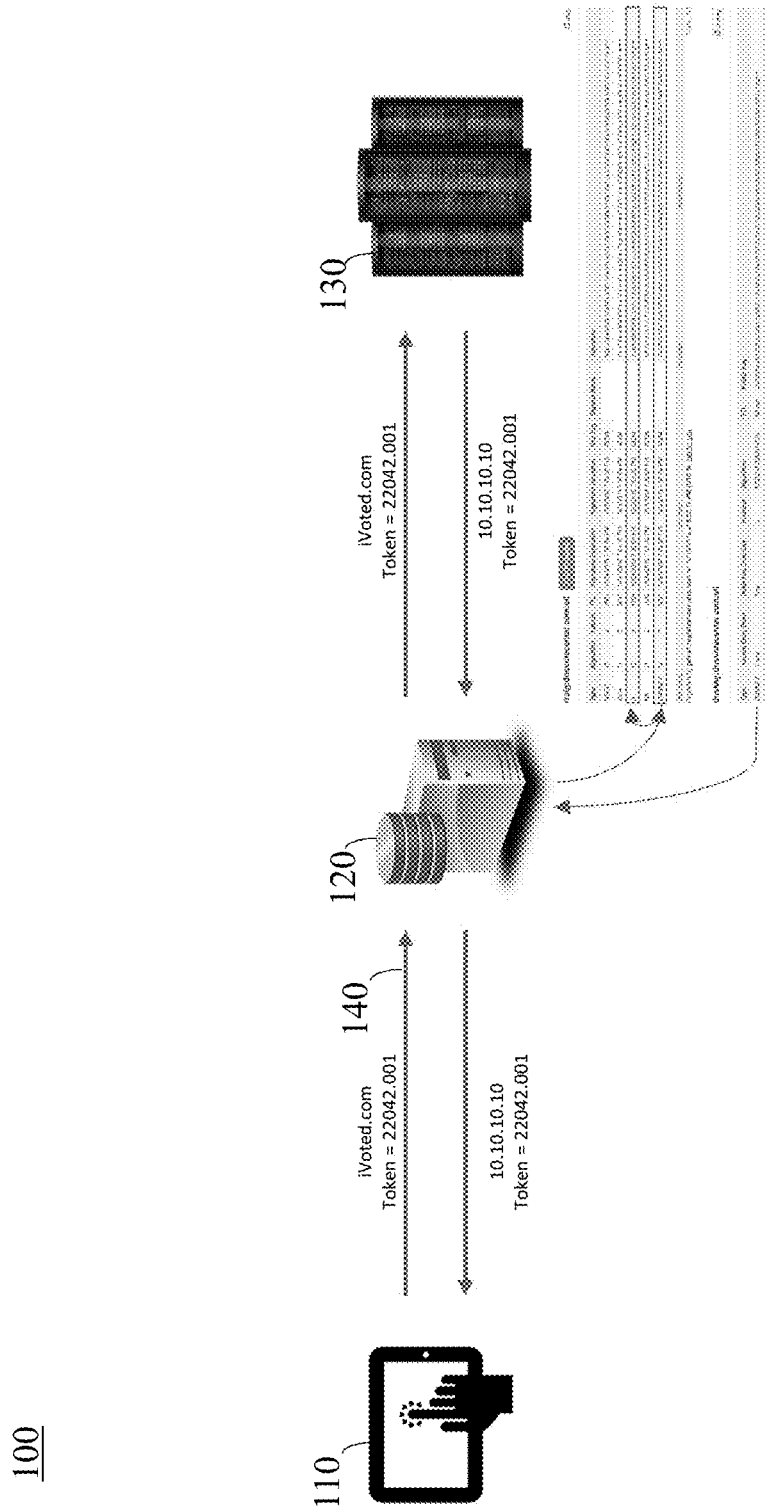
FIG. 1 illustrates a voting system according to some embodiments.

Now referring to FIG. 1, an embodiment of a voting system 100 is illustrated. As illustrated in FIG. 1, the voting system comprises, but it not limited to, three tiers: a voting station 110, a recursive server (RS) 120 and an authoritative name server (ANS) 130. The voting station 110 may comprise a computing device, such as, but not limited to a desktop computer, a cell phone, a tablet computer or a laptop computer.

The RS 120 may comprise a computing device, such as, but not limited to, a network server computer. The RS 120 may provide a name server service for networked computers/devices that submit Domain Name System (DNS) related queries. The RS may be responsible for providing a proper IP address of an intended domain name to a requesting computer/device.

The ANS 130 may comprise a computing device, such as, but not limited to, a network server computer. The ANS 130 may provide an actual answer to a DNS query received from the RS 120, where the DNS query relates to domain names that are installed in the ANS' configuration system. The ANS 130 may respond to the RS with important information associated with each domain, such as corresponding IP addresses and other necessary DNS records. Communication between the voting station 110, the RS 120 and the ANS 130 may be over a network 140. The network may comprise any known network such as a local area network, a wide area network or a metropolitan area network. In some embodiments, the network may utilize a Virtual Private Network (VPN) infrastructure and a private domain such that any domain name service (DNS) queries are not resolvable in a public internet. In some embodiments, the VPN infrastructure may comprise a private network that runs over a public (e.g., state, town, city) network which may enable a voter to send and receive data across the public network. By using a VPN, the voting system 100 may be further secured and may benefit from the functionality, security, and management of the VPN network. To ensure security, a VPN network connection may utilize an encrypted layered tunneling protocol and each voter may be required to use a password or a certificate to authenticate themselves to the VPN.

For purposes of illustrating features of the present embodiments, some simple examples will now be introduced and referenced throughout the disclosure. Those skilled in the art will recognize that these examples are illustrative and are not limiting and are provided purely for explanatory purposes.

Figure 2:
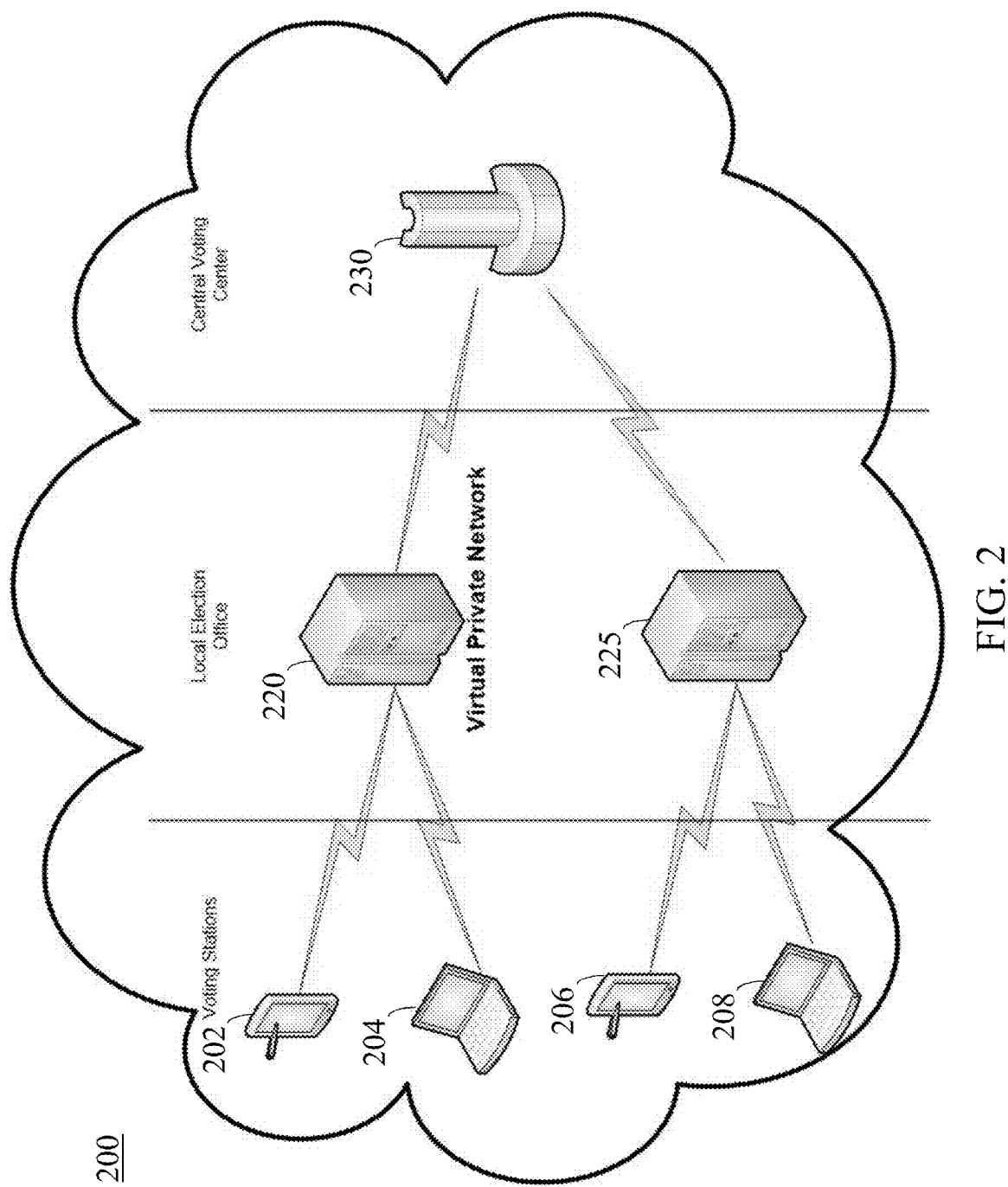
FIG. 2 illustrates a voting system according to some embodiments.

As illustrated in FIG. 1, the voting station 110 that is associated with a voting precinct may receive an electronic vote from a voter. In this example, the voter voted for candidate X. The RS 120 may receive the electronic vote from the voting station in a DNS query and the RS 120 may use the electronic vote to determine a voting precinct vote count. For example, and now referring to FIG. 2, each voting precinct may be associated with its own RS 220/225. As illustrated in FIG. 2, a first voting precinct may be associated with RS 220 and a second voting precinct may be associated with RS 225. The RS 220 associated with the first voting precinct receives votes from voting station 202 and voting station 204. The RS 225 associated with the second voting precinct receives votes from voting station 206 and voting station 208.

Referring back to FIG. 1, the ANS 130 may receive the electronic vote from the RS 120 and determine a final vote count associated with one or more voting precincts such as is the case with ANS 230 of FIG. 2. As illustrated in FIG. 1, voting station 110 may transmit the electronic vote to the RS 120 in a domain name service (DNS) query. Furthermore, the electronic vote may comprise a token that is defined by a unique identifier associated with the voter and/or the voting precinct. For example, and as illustrated in FIG. 1, a token comprising "22042.001" may be transmitted from the voting station 110 to the RS 120. In this example, the 22042 may comprise a unique identifier associated with the voter (e.g., a hash value based on an assigned voter identification number and a time stamp of when a vote occurred) and the 001 may comprise a unique identifier associated with the voting precinct. However, various other schemes to create a token may also be used. For example, the unique token may be based on a combination and/or hash value of various elements such as, but not limited to, identification of the voter, an identification of the voting station, a time stamp, latitude and longitude coordinates of the voting station, a government identification of the voter, and/or a birth date of the voter. The token may be passed to the RS 120 in the DNS query and the token may again be passed to the ANS 130 when the RS 120 attempts to resolve the address in the DNS query. When the RS 120 receives the DNS query, it may create a temporary voting precinct count based the electronic vote comprising the token.

The DNS query may be resolved at the ANS 130 along with a digital signature associated with the ANS and the DNS query may be added to a total query count at the ANS 130 to create a temporary total vote count. The resolved DNS query may then be transmitted from the ANS 130 to the RS 120 to validate the digital signature and the resolved DNS query may be verified against the precinct count. These will be explained in more detail in reference to FIG. 3 and FIG. 4.

In a case that the digital signature validation determines a valid digital signature and the resolved DNS query is successfully verified against the precinct count, a confirmation may be sent to the voting station 110 to verify that the token in the resolved DNS query matches the token assigned at the voting station 110 and sent in DNS query from the voting station 110. In a case that the voting station determines that the token associated with the confirmation does not match the token sent by the voting station 110, the resolved DNS query may be rejected and a message may be transmitted to the ANS 130 and to the RS 120 to disregard the electronic vote. In a case that the voting station determines that the token associated with the confirmation matches the token sent by the voting station, the resolved DNS query may be accepted and the vote may be added to the final vote count at the ANS 130 and at the voting station.

Figure 3:
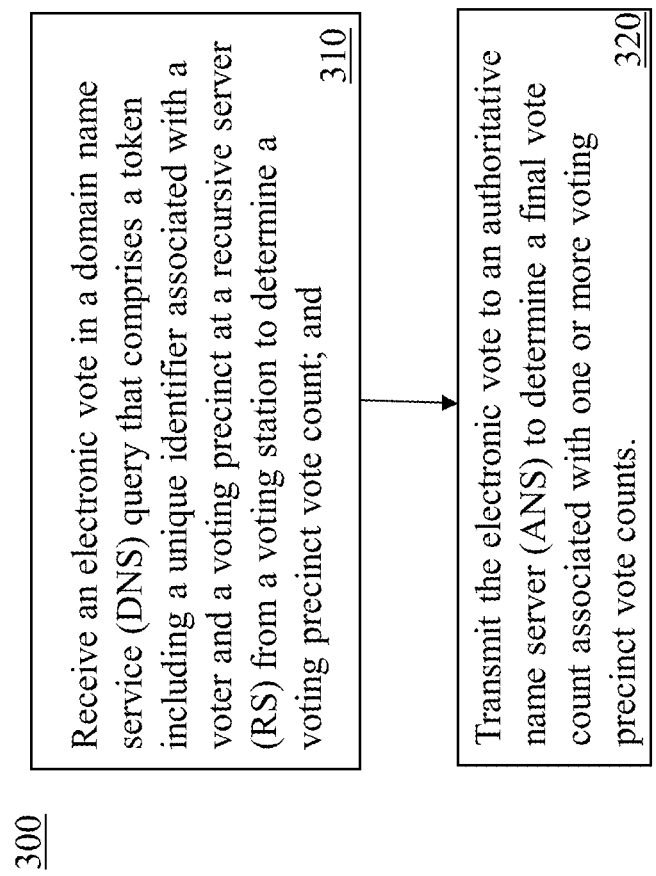
FIG. 3 illustrates a method in accordance with some embodiments.

Now referring to FIG. 3, a method 300 that might be performed by the RS 120 of voting system 100, as described with respect to FIG. 1, is illustrated according to some embodiments. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that when executed by a machine result in performance according to any of the embodiments described herein.

Method 300 may relate to a secure method of internet voting. Now referring to 310, an electronic vote may be received at a recursive server (RS) from a voting station, to determine a voting precinct vote count. For example, and as illustrated at 402 of FIG. 4, an electronic vote, or ballot, may be submitted by a voter that is voting at a voting precinct. The electronic vote may then be parsed into a DNS query at 404 along with a unique token. The electronic vote may also be added to a temporary vote count at the voting station. The DNS query at 404 may be submitted to the RS at 406 where the RS adds the electronic vote to a precinct count at 408.

Referring back to FIG. 3, at 320, the electronic vote may be transmitted to an ANS for determination of a final vote count associated with one or more voting precinct vote counts. For example, and as illustrated at 410 of FIG. 4, the DNS query may be received at the ANS. At 412, the DNS query may be added to a query count and the ANS may then create a temporary final vote count at 415.

To verify the authenticity of the electronic vote, the DNS query may be resolved at 414 and the resolved DNS query may be sent, or passed back, to the RS along with the unique token initially sent in the DNS query. At 416, the resolved DNS query may be received at the RS with a digital signature (DS) that was created by the ANS. The DS is validated at the RS to ensure that the resolved DNS query came from a known ANS. The DS may comprise a cryptographic signature that is added to existing DNS records by the ANS. These digital signatures may be stored in DNS name servers alongside common record types like A, AAAA, MX, CNAME, etc. By checking a digital signature, it can be verified that a requested DNS record came from its ANS and wasn't altered en-route such as a fake record that has been injected in a man-in-the-middle attack.

At 418, the resolved DNS query may be verified against a precinct count. In other words, a count of registered voters at a precinct may be used as a comparison to make sure that the present vote does not exceed a number of registered voters at a precinct. For example, if there are only 1000 registered voters assigned to a voting precinct, the RS will reject any votes if the count is greater than 1000. If the verification at 418 indicates that a precinct count was exceeded (e.g., a verification of no) the digital signature is rejected at 424 and the electronic vote is canceled at 426. If the verification at 418 indicates that a precinct count was not exceeded (e.g., a verification of yes) a finalized count is created and the DS is approved at 428. Next, a signal is sent to the ANS, at 430, to finalize the count and a confirmation message containing the unique token for confirming submission of the electronic vote is created at 432. The confirmation message of 432 is transmitted to the voting station to confirm the unique token at 434. If the token is verified at 436 (e.g., the token initially sent by the voting station matches the token received), the voting station vote count is incremented and the vote submitted by the voter is approved at 438. A final station count is incremented at 440.

As illustrated in FIG. 2, each computing devices involved in this voting system (e.g., the voting station, the RS and the ANS) may be protected in a private network infrastructure. In this embodiment, auditing the voting station against the RS; and auditing the RS connecting to the ANS may disclose potential unwarranted actors that may threaten to inject fake votes.

Figure 4:
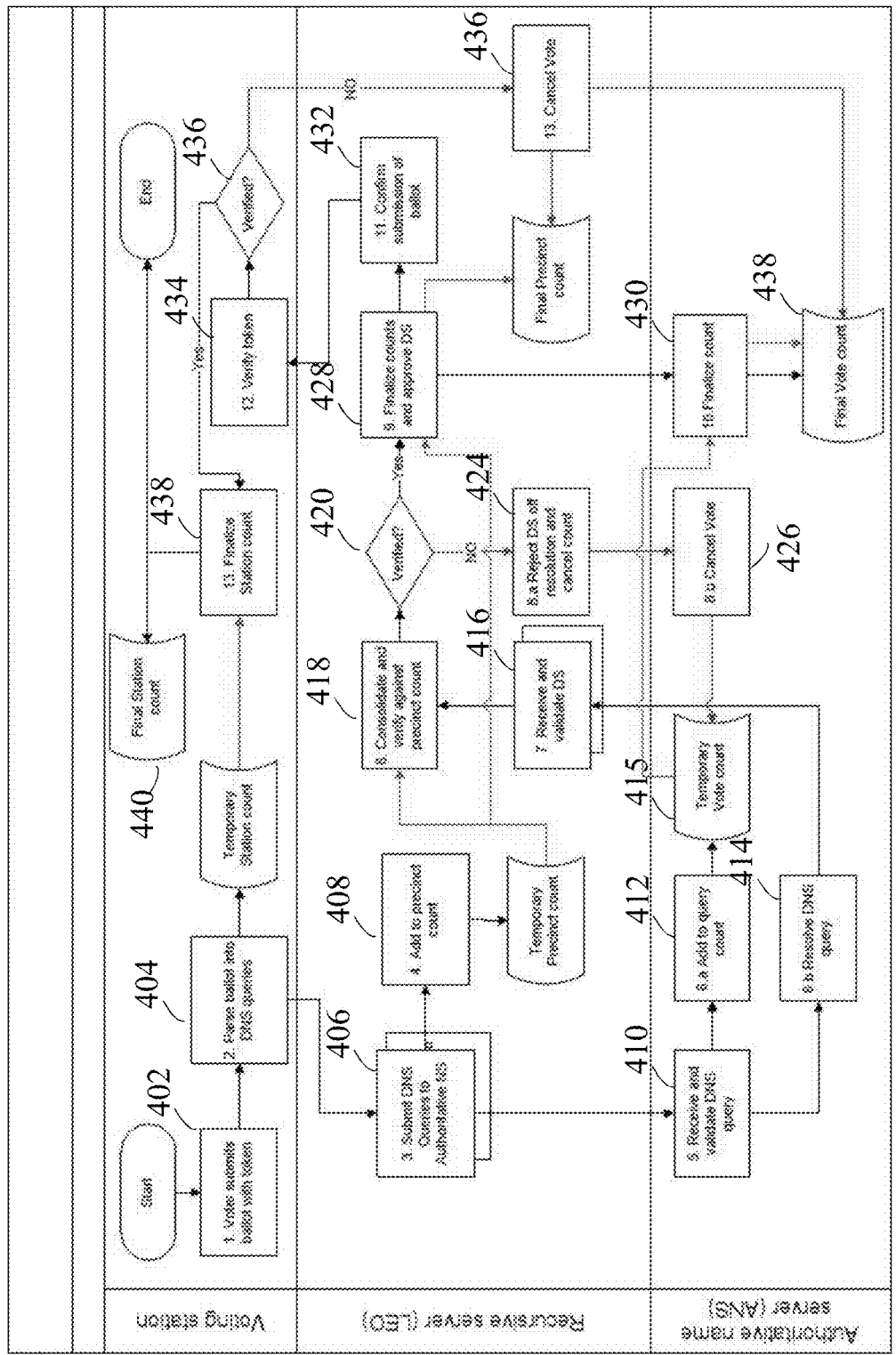
FIG. 4 illustrates a voting system according to some embodiments.

As illustrated in FIG. 4, a count of the electronic votes is stored at all three tiers: the voting station, the RS and the ANS. In this regard, comparing the vote count at all three tiers may disclose any votes that were injected into a specific tier. Such a disclosure would indicate that someone may have hacked into the system or there may be fraudulent votes.

For purposes of illustrating security features of the present embodiments described with respect to FIG. 4, some simple examples will now be introduced to illustrate how the system of FIG. 4 may prevent hacking at each tier of the voting system. Those skilled in the art will recognize that these examples are illustrative and are not limiting and are provided purely for explanatory purposes.

Having a protected network infrastructure, a hacker may attempt to infiltrate the system by pretending to be an authorized computing device. These examples illustrate how the system of FIG. 2 may detect and reject unauthorized devices. Looking at the first tier, if a hacker attempts to pretend to be a voting station, the pretend voting station would have to show proof of authorization that may include, but is not limited to, a source IP address and an ASN (Asynchronous System Number) that is recognized and authorized by the RS.

Looking at the second tier, if a hacker attempts to pretend to be an RS, the fake RS would have to show proof of authorization that may include, but is not limited to, a source IP address and ASN that is recognized and authorized by the ANS.

Having a three-tiered system, a hacker may attempt to inject a fake vote in any of the three tiers. These examples may illustrate how the system of FIG. 4 may reject the fake votes. Looking at the first tier, if a hacker injects a fake vote at the voting station, the fake vote may be parsed into a DNS query and sent to the RS. However, the fake vote would be parsed into a DNS query (at 404) without a unique token because the unique token may be created based on a variety of information that is associated with a particular voter (e.g., a hash algorithm that calculates the token based on voter and/or precinct information). The fake vote might also be parsed into a DNS query (at 404) with a fake token, since a genuine token is only created when a voter submits a vote and the token is based on the voter's information. Thus, when the fake token is verified at 434, the system voting station will reject the fake vote which will nullify the vote at the voting station, the RS and the ANS.

Looking at the second tier, if a hacker injects a fake vote at the RS, where the fake vote comprises a DNS query with a fake token or without a token, the fake vote will again fail a verification of the token that is legitimately created when a voter submits a vote (at 434) so the system voting station will reject the fake vote which will nullify the vote at the voting station, the RS and the ANS. Similarly, the RS may set rate limits to manage the flow of incoming votes as you can never have two votes coming from the same voting station at the same time. In another example, if the fake vote is injected as pretending to come from the ANS (e.g., at 416), the digital signature associated with the ANS would not match the digital signature known at the DS of its ANS.

Looking at the third tier, if a hacker injects a fake vote at the ANS, where the fake vote is a DNS query that comprises a fake token, the DNS query will be resolved at the ANS and the fake vote with the fake token may then be sent to the RS. The fake vote will again fail a verification of the token that is legitimately created when a voter submits a vote (at 434) so the system voting station will reject the fake vote which will nullify the vote at the voting station, the RS and the ANS. Additionally, the ANS may set total counts per RS to determine any unauthorized votes that may be injected.

Figure 5:
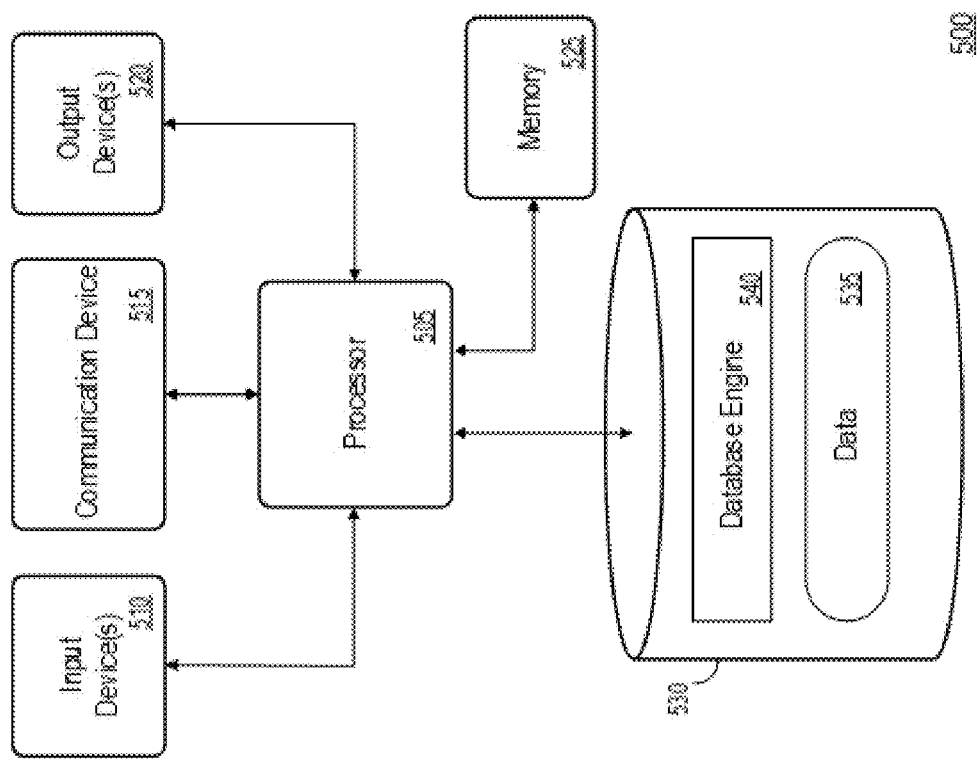
FIG. 5 illustrates a voting system device in accordance with some embodiments.

Note the embodiments described herein may be implemented using any number of different hardware configurations. For example, FIG. 5 illustrates a voting system device 500 that may be, for example, associated with the system 100 of FIG. 1 (e.g., a voting station 110, an RS 120 or an ANS 130). The voting system device 500 may provide a technical and commercial advantage by providing a system that allows for electronic voting over a computer network and has robust security to prevent hackers from changing or injecting votes.

The voting system device 500 may comprise a processor 505 ("processor"), such as one or more commercially available Central Processing Units (CPUs) in the form of one-chip microprocessors, coupled to a communication device 515 configured to communicate via a communication network (not shown in FIG. 5). The communication device 515 may be used to communicate, for example, with one or more voters or other voting system devices. The voting system device 500 further includes an input device 510 (e.g., a mouse and/or keyboard) and an output device 520 (e.g., to output and display data to a voter or system user).

The processor 505 also communicates with a memory/ storage device 530 that stores data 535. The storage device 530 may comprise any appropriate information storage device, including combinations of magnetic storage devices (e.g., a hard disk drive), optical storage devices, mobile telephones, and/or semiconductor memory devices. The storage device 530 may store a program and/or processing logic for controlling the processor 510. The processor 505 performs instructions of the programs, and thereby operates in accordance with any of the embodiments described herein. For example, the processor 505 may receive data such as, but not limited to, unannotated sentences and may create a model based on the received data.

The programs may be stored in a compiled, compressed, uncompiled and/or encrypted format or a combination. The programs may furthermore include other program elements, such as an operating system, a database management system, and/or device drivers used by the processor 505 to interface with peripheral devices. The storage device 530 may comprise or may function in conjunction with a database engine 540 to read and write to a database.

As used herein, information may be "received" by or "transmitted" to, for example: (i) the RS from another device; or (ii) a software application or module within the RS from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The process flow and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein. The method steps can then be carried out using the distinct software modules and/or sub-modules of the system, as described above, executing on one or more hardware processors. Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. An electronic voting system, comprising:
   a voting station associated with a voting precinct for (i) receiving an electronic vote from a voter, (ii) parsing the received electronic vote into a domain name service (DNS) query comprising a token (iii) incrementing a temporary station count and (iv) transmitting the DNS query to a recursive server (RS);
   the recursive server (RS) for (i) receiving the DNS query from the voting station, (ii) incrementing a temporary voting precinct vote count and (ii) transmitting the received DNS query to an authoritative name server (ANS); and
   the ANS for resolving the received DNS query and for incrementing a temporary vote count, wherein the DNS query is resolved at the ANS to determine a digital signature associated with the token, wherein the DNS query including the token and the digital signal are transmitted to the RS for validation,
   wherein the RS validates the digital signal created by the ANS, and in response to the validation (i) the RS finalizes the temporary precinct count based on the validated digital signature, (ii) a message is transmitted to the ANS to finalize the final vote count, and (iii) the token is transmitted back to the voting station to verify the token,
   and
   wherein the voting station determines that the token received from the RS matches the token transmitted by the voting station, and the voting station finalizes the station count based on the verified token.

2. The electronic voting system of claim 1, wherein transmitting between the voting station, the RS and the ANS is via a Virtual Private Network infrastructure and any domain name service (DNS) queries are not resolvable in a public internet.

3. A method comprising:
   receiving an electronic vote at a recursive server (RS), from a voting station, for determining, via a processor, a voting precinct vote count wherein the electronic vote is from a voter that is voting at a voting precinct; and
   transmitting the electronic vote in a domain name service (DNS) query from the RS to an authoritative name server (ANS) wherein the DNS query is resolved at the ANS to determine a digital signature associated with the token, wherein the DNS query including the token and the digital signal are transmitted to the RS for validation,
   wherein the RS validates the digital signal created by the ANS, (i) the RS finalizes the temporary precinct count based on the validated digital signature, (ii) a message is transmitted to the ANS to finalize the final vote count, and (iii) the token is transmitted back to the voting station to verify the token,
   wherein the voting station determines that the token received from the RS does not match the token transmitted from the voting station, and in response to the determination that the token does not match the token transmitted from the voting station, a message is transmitted to both the ANS and RS to disregard the electronic vote and to the temporary precinct count.

4. The medium of claim 3, wherein transmitting between the voting station, the RS and the ANS is via a Virtual Private Network infrastructure and any domain name service (DNS) queries are not resolvable in a public internet.

5. The method of claim 3, wherein transmitting between the voting station, the RS and the ANS is via a Virtual Private Network infrastructure and any domain name service (DNS) queries are not resolvable in a public internet.

6. An electronic voting system, comprising:
   a voting station associated with a voting precinct for (i) receiving a first electronic vote from a first voter and a second electronic vote from a second voter, (ii) parsing the received electronic first vote into a first domain name service (DNS) query comprising a first token, (iii) parsing the received electronic second vote into a second domain name service (DNS) query comprising a second token and (iv) incrementing a temporary station count and (v) transmitting the first DNS query and the second DNS query to a recursive server (RS);
   the RS for (i) receiving the first DNS query and the second DNS query from the voting station, (ii) incrementing a temporary voting precinct vote count and (ii) transmitting the received first DNS query and the received second DNS query to an authoritative name server (ANS); and
   the ANS for resolving the received first DNS query and the received second DNS query and for incrementing a temporary vote count, wherein the first DNS query is resolved at the ANS to determine a first digital signature associated with the first token, wherein the first DNS query including the token and the digital signal are transmitted to the RS for validation, wherein the second DNS query is resolved at the ANS to determine a second digital signature associated with the second token, wherein the first DNS query including the first token and the first digital signature and the second DNS query including the second token and the second digital signature are transmitted to the RS for validation, wherein the RS validates the first digital signature created by the ANS, and in response to the validation (i) the RS finalizes the temporary precinct count based on the validated digital signature that is associated with the first electronic vote, (ii) a message is transmitted to the ANS to finalize the final vote count associated with the first electronic vote, and (iii) the token is transmitted back to the voting station to verify the token, wherein the voting station determines that the first token received from the RS matches the first token transmitted by the voting station, and the voting station finalizes the station count associated with the first electronic vote based on the first verified token, and wherein the voting station determines that the second token received from the RS does not match the second token transmitted from the voting station, and in response to the determination that the second token does not match the token transmitted from the voting station, a message is transmitted to both the ANS and RS to disregard the electronic vote associated with the second electronic vote and to disregard the temporary precinct count associated with the second electronic vote.

7. The system of claim 6, wherein transmitting between the voting station, the RS and the ANS is via a Virtual Private Network infrastructure and any domain name service (DNS) queries are not resolvable in a public internet.

\* \* \* \* \*